United States Patent
Guyot et al.

(10) Patent No.: US 8,019,935 B2
(45) Date of Patent: Sep. 13, 2011

(54) RANDOM NUMBER GENERATION FOR A HOST SYSTEM USING A HARD DISK DRIVE

(75) Inventors: Cyril Guyot, San Jose, CA (US); Zvonimir Bandic, San Jose, CA (US); Anand Krishnamurthi Kulkarni, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 595 days.

(21) Appl. No.: 11/963,839

(22) Filed: Dec. 23, 2007

(65) Prior Publication Data

US 2010/0030958 A1   Feb. 4, 2010

(51) Int. Cl.
*G06F 12/00* (2006.01)
*G06F 7/58* (2006.01)

(52) U.S. Cl. ............... 711/112; 711/E12.001; 708/250
(58) Field of Classification Search ................. None
See application file for complete search history.

(56) References Cited

U.S. PATENT DOCUMENTS

| | | | |
|---|---|---|---|
| 6,502,116 B1 | 12/2002 | Kelly et al. | |
| 7,136,889 B1 * | 11/2006 | Schreck | 708/250 |
| 7,167,882 B2 * | 1/2007 | Xie et al. | 708/250 |
| 7,181,641 B2 | 2/2007 | Greenwald et al. | |
| 7,242,776 B1 * | 7/2007 | Elliot | 380/278 |
| 7,330,328 B2 * | 2/2008 | Xie et al. | 360/75 |
| 7,545,931 B2 * | 6/2009 | Dillaway | 380/44 |
| 7,660,944 B2 * | 2/2010 | Luo | 711/112 |
| 2003/0194085 A1 * | 10/2003 | Dillaway | 380/29 |
| 2004/0258398 A1 | 12/2004 | Cho et al. | |
| 2005/0055390 A1 * | 3/2005 | Xie et al. | 708/250 |
| 2007/0118581 A1 | 5/2007 | Henry et al. | |
| 2007/0195448 A1 * | 8/2007 | Xie et al. | 360/75 |
| 2008/0022039 A1 * | 1/2008 | Luo | 711/112 |

FOREIGN PATENT DOCUMENTS

JP   2005011356 A  *  1/2005

OTHER PUBLICATIONS

U.S. Appl. No. 11/963,837, filed Dec. 23, 2007, Bandic et al.

* cited by examiner

*Primary Examiner* — Kevin Verbrugge
(74) *Attorney, Agent, or Firm* — Steven J. Cahill

(57) ABSTRACT

A hard disk drive is provided for enhancing random number generation. In particular embodiments, the hard disk drive includes a storage subsystem and a controller. The controller generates a random number based on information associated with the storage subsystem. The controller transmits the random number to a host system.

19 Claims, 3 Drawing Sheets

RANDOM NUMBER GENERATION FOR A HOST SYSTEM USING A HARD DISK DRIVE

CROSS-REFERENCE TO RELATED APPLICATION

This application is related to commonly assigned U.S. patent application Ser. No. 11/963,837, filed concurrently herewith, to Zvonimir Bandic et al., which is incorporated by reference herein.

BACKGROUND OF THE INVENTION

The present invention relates to computer systems, and more particularly, to random number generation.

Random numbers have a variety of applications in cryptography, statistics, lotteries, gambling, etc. When generated, random numbers are ideally arbitrary and unpredictable. However, generating truly random numbers is non-trivial.

BRIEF SUMMARY OF THE INVENTION

The present invention provides techniques for enhancing random number generation. According to some embodiments of the present invention, a hard disk drive includes a storage subsystem and a controller. The controller generates a random number based on information associated with the storage subsystem. The controller transmits the random number to a host system.

Various objects, features, and advantages of the present invention will become apparent upon consideration of the following detailed description and the accompanying drawings.

DETAILED DESCRIPTION OF THE INVENTION

Random numbers may be characterized as weak (more predictable) or strong (less predictable) where perfectly random numbers are the strongest. In computing, software programs, referred to as pseudorandom number generators, generate weaker random numbers than hardware random number generators, because pseudorandom number generators are finite state machines. Finite state machines, having a finite number of states, are predictable, and thus cannot produce truly random numbers.

Accordingly, when a user generates random numbers for a given application (e.g., for generating cryptographic keys), the user typically requires a random number seed to initialize a pseudorandom number generator. Without a random number seed, a deterministic algorithm for generating cryptographic keys will generate the same keys.

Accordingly, users often use a hardware random number generator such as a random number generator dongle that is dedicated to generating random numbers. Hardware random number generators exploit physical phenomena such as noise, which has inherent entropy or randomness. The random number generator can convert noise into a random bit sequence or random number. The generated random number can then be used as a random number seed in a pseudorandom number generator. While dongles may produce stronger random numbers than software random number generators, dongles may be expensive.

Particular embodiments of the present invention provide techniques for enhancing random number generation. As described in more detail below, in one embodiment, a hard disk drive functions to generate one or more random numbers for a user. The hard disk drive generates random numbers and sends the random numbers to a host system. A user can access the random numbers for various applications such as cryptographic-related applications.

Figure 1:
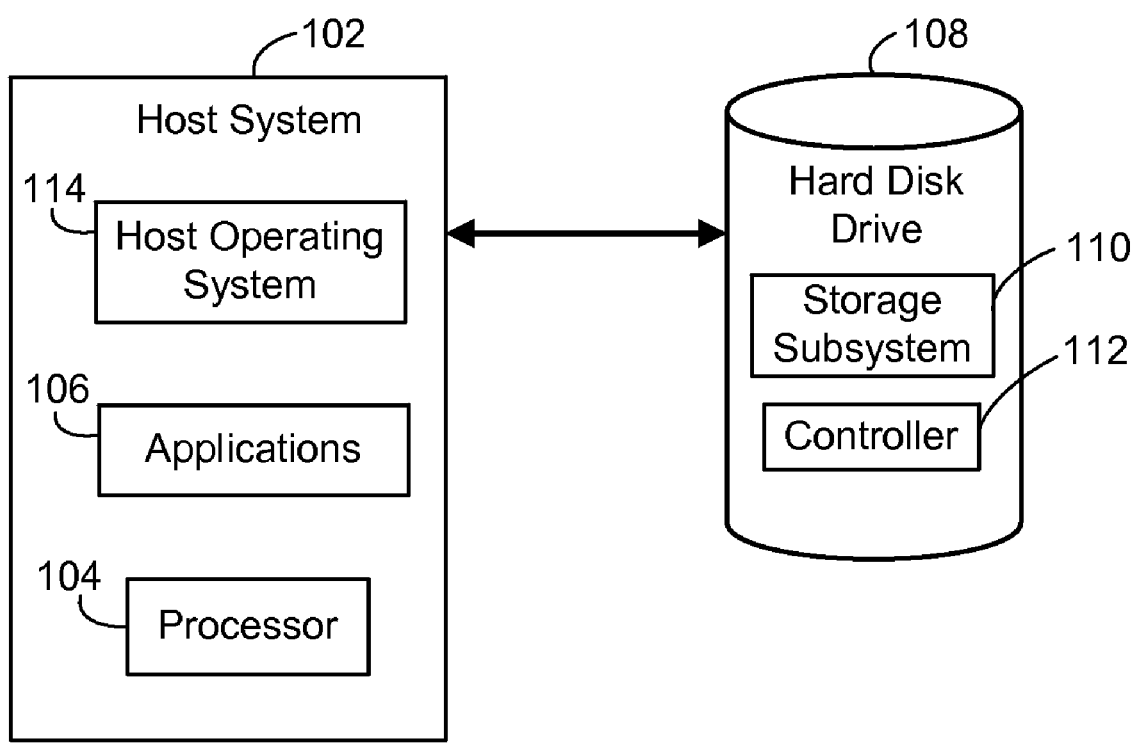
FIG. 1 is a block diagram that illustrates a host system and a hard disk drive, according to an embodiment of the present invention.

FIG. 1 is a block diagram that illustrates a system 100, according to an embodiment of the present invention. System 100 includes a host system 102 and hard disk drive 108. Host system 102 includes a host operating system 114, software applications 106, and a processor 104. Host operating system 114 and applications 106 typically run on processor 104. Host system 102 can be any type of computer system such as an embedded system, a minimalistic system, a hand-held device or computer, etc.

System 100 also includes a hard disk drive 108 that includes a storage subsystem 110 and a controller 112. Hard disk drive 108 can be a part of the same system as host system 102 or a different system, depending on the specific implementation.

Figure 2:
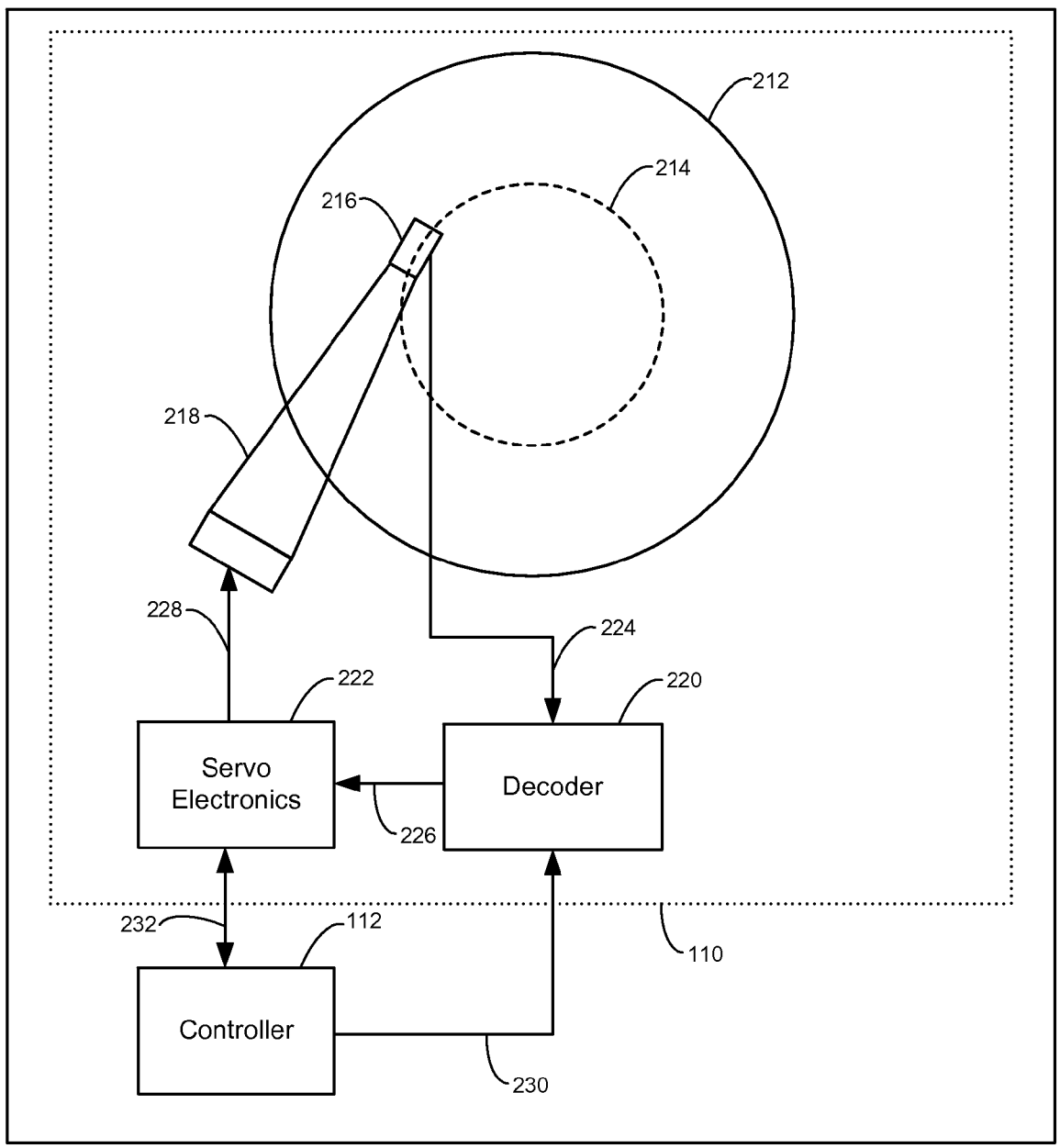
FIG. 2 is a block diagram that illustrates a portion of the hard disk drive of FIG. 1, according to an embodiment of the present invention.

FIG. 2 is a block diagram that illustrates a portion of the hard disk drive 108 of FIG. 1, including details of storage subsystem 110, according to an embodiment of the present invention.

In one embodiment, storage subsystem 110 of hard disk drive 108 includes a magnetic hard disk 212, read/write head 216 (also called a data recording transducer), actuator 218, decoder 220, and servo electronics 222. Hard disk 212 has a set of radially spaced tracks, one of which is shown at track 214. Information is written to and/or read from track 214 by read/write head 216. Read/write head 216 includes a read sensor for reading magnetic patterns on disk 212 and a write element for writing magnetic patterns on disk 212. Read/write head 216 is connected to actuator 218, which radially positions head 216 over a selected track.

Read/write head 216 is connected to decoder 220, as indicated by line 224. As track 214 passes under read/write head 216, the read/write head 216 encounters servo sectors and data sectors. Decoder 220 receives a bit stream from the read sensor corresponding to the bit stream recorded on track 214, and functions to detect the servo timing mark (STM) bit pattern in the servo sectors as they pass under read/write head 216. The STM is a fixed vector that helps synchronize the information that follows it. The servo information, such as the track identification (TID) and the servo sector identification, typically follows the STM.

Upon identification of an STM bit pattern, decoder 220 transmits an "STM found" signal to servo electronics 222, as schematically indicated by line 226 in FIG. 1. Servo electronics 222 also receives servo information from decoder 220, and makes use of the servo information, gated by the "STM found" signal, to perform closed loop control of actuator 218, schematically indicated by line 228, such that read/write head 216 is centered over a desired track (i.e., track 214 in this example).

Controller 112 is coupled to decoder 220 and to servo electronics 222 as indicated by lines 230 and 232, respectively. In operation, controller 112 controls the operations of storage subsystem 110, including decoder 220 and servo electronics 222. Controller 112 also communicates with the host system 102 (FIG. 1) to exchange control information and data (e.g., commands to generate random numbers, resulting random numbers, etc.). Operations of hard disk drive 108 are described in more detail below.

Figure 3:
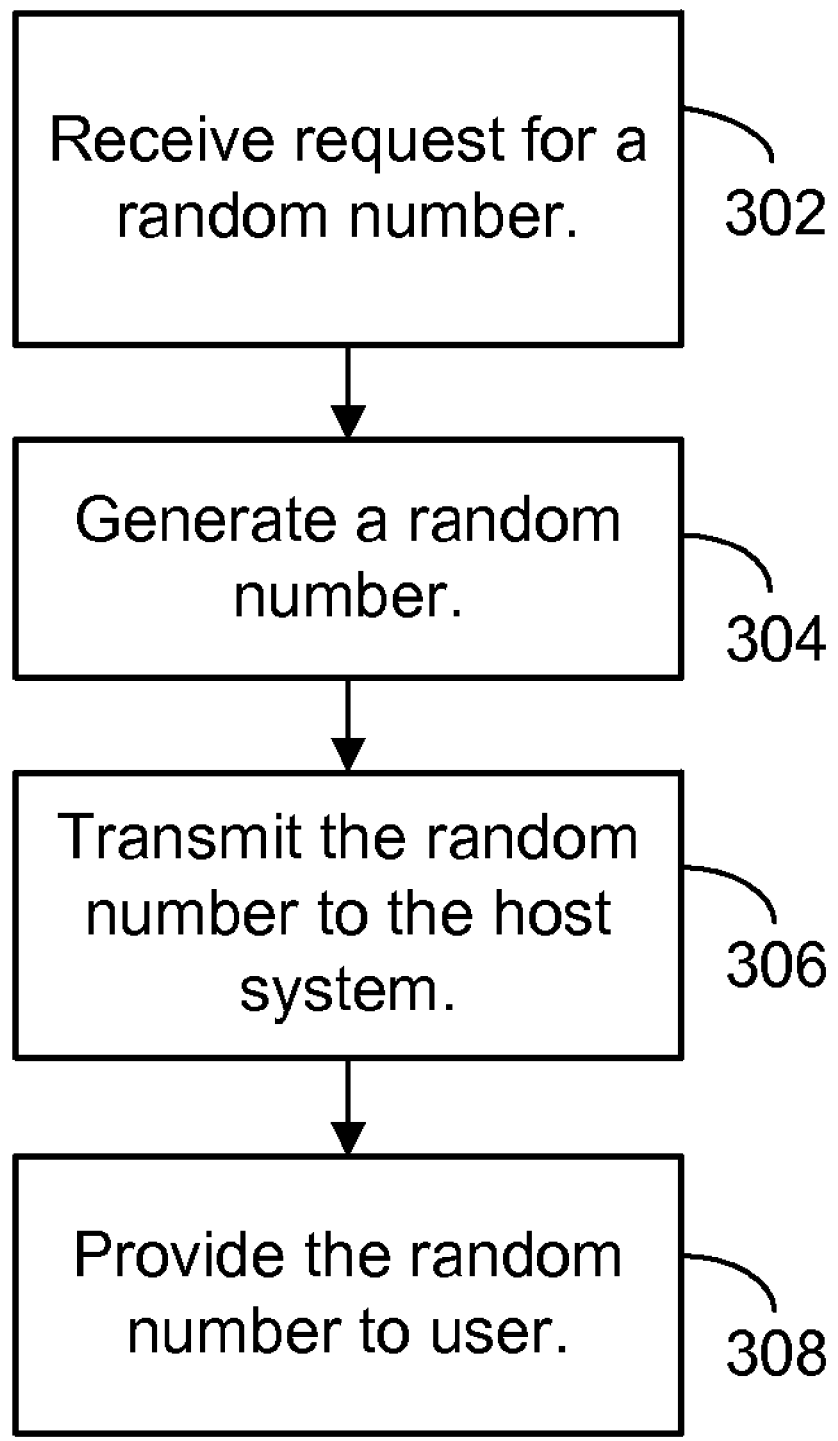
FIG. 3 is a flow chart that illustrates a process for generating a random number and providing the random number to a user, according to an embodiment of the present invention.

FIG. 3 is a flow chart that illustrates a process for generating a random number and providing the random number to a user, according to an embodiment of the present invention. As FIG. 3 shows, the process begins at step 302 where hard disk drive 108 receives a request from host system 102 to generate a random number. The request can be transmitted, for example, from host operating system 114 or from one of software applications 106.

In one embodiment, the request is a command exclusively requesting a random number. In another embodiment, the request is a part of code that augments an existing command requesting other information. For example, in one embodiment, an existing command requesting other information is a hard disk drive command or a standardized command, such as an Advanced Technology Attachment (ATA) command for ATA hard disk drives or a Small Computer System Interface (SCSI) command for SCSI hard disk drives.

Existing commands can be augmented with code that includes a request to generate a random number. In one embodiment, an existing command from a pseudorandom number generator such as Linux random number generator is augmented with code that includes a request to generate a random number, where the request is sent to hard disk drive 108. At step 304, in response to the request, hard disk drive 108 generates a random number. As described in more detail below, hard disk drive 108 can generate the random number using various techniques. For example, in one embodiment, hard disk drive 108 generates random numbers based on information associated with the physical state of storage subsystem 110. In one embodiment, controller 112 of hard disk drive 108 performs operations described herein (e.g., collecting data and taking measurements) and performs calculations to generate random numbers. To generate random numbers, controller 112 can utilize a random number generation application stored in hard disk drive 108 or in another suitable location.

At step 306, hard disk drive 108 transmits the random number to host system 102. The hard disk drive 108 can, for example, transmit the random number to host operating system 114 or to one of software applications 106 in host system 102. The hard disk drive 108 typically returns the random number to the operating system or to the application that requested the random number at step 302.

At step 308, after host system 102 receives the random number from hard disk drive 108, host system 102 can then provide the random number to a user. For example, host operating system 114 or one of applications 106 can provide the random to the user through a user interface.

For a given random number, host system 102 can process the random number internally (e.g., to generate an encryption key), display the random number to the user via a user interface on a display screen, and/or export the random number to the user via any suitable port, such as a Universal Serial Bus port (and other devices). Accordingly, generating the random number using hard disk drive 108 eliminates the need for a random number generator dongle. A benefit of the user accessing the random number is that the user can use the true random number directly as a seed for a pseudo random number generation program. This provides a method for the user to generate truly unpredictable cryptographic keys.

Random Number Generation

As indicated above, hard disk drive 108 can generate random numbers based on information associated with the physical state of storage subsystem 110. For example, hard disk drive 108 can perform numerous physical processes when writing data to or reading data from the magnetic hard disk, or when performing routine maintenance functions. Each of these physical processes has inherent entropy or randomness. For a given process, hard disk drive 108 is operable to measure aspects, the measurements of which have a certain degree of randomness. Hard disk drive 108 can then convert such measurements to a random number. Because hard disk drive 108 generates random numbers based on physical processes, hard disk drive 108 generates strong random numbers.

For example, in one embodiment, hard disk drive 108 can generate a random number based on noise associated with inherent errors that occur when reading and writing data from hard disk 212. Generally, the data that a hard disk drive reads from a magnetic hard disk contains errors relative to the original data that was written on the hard disk. As such, hard disk drives utilize redundancy and error correction algorithms to detect and correct the errors in the data read from the hard disk so that the original data can be reconstructed. In one embodiment, hard disk drive 108 utilizes errors in the data read from a hard disk to generate a random number.

In one embodiment, hard disk drive 108 measures the position of read/write head 216 relative to the magnetic hard disk 212 over a given time period. These measurements may vary randomly and can provide sufficient data for hard disk drive 108 to generate random numbers. Servo sectors that are written on hard disk 212 during the servo writing process contain servo information. In a specific embodiment, hard disk drive 108 can generate random numbers based on the servo information in the servo sectors. The servo information includes positional information of the read/write head 216 relative to the tracks of the hard disk. This positional information facilitates controller 112 in locating read/write head 216 both laterally and longitudinally relative to a given servo sector on hard disk 212. Controller 112 uses the positional information to calibrate signals that read/write head 216 reads from disk 212. Depending on where read/write head 212 is on track 214, the value extracted by read/write head 212 may be different. In one embodiment, hard disk drive 108 generates a random number based on the difference between positional information of the read/write head 216 at different locations on a track of disk 212. The positional information is derived from reading the servo information in one or more servo sectors.

Each servo sector includes an automatic gain control portion (AGC). The AGC portion of the servo sector indicates how much read/write head 216 needs to amplify or adjust the gain of the signal from the read sensor such that read/write head 216 reads the data from the sector at the same current level as the other sectors. In one embodiment, hard disk drive 108 generates random numbers based on the automatic gain control values read from AGC portions of the servo sectors.

Thus, hard disk drive 108 can generate random numbers based on automatic gain control values generated by reading the AGC portions of the servo sectors. Controller 112 multiplies the automatic gain control value by each signal that read/write head 216 reads while passing over the servo sector.

Various embodiments of methods for generating a random number using a hard disk drive are described in a co-pending U.S. patent application Ser. No. 11/963,837 filed herewith, and entitled "Random Number Generation Using Hard Disk Drive Information," which is incorporated by reference herein.

Randomness Quality of Generated Random Numbers

In one embodiment, hard disk drive 108 also generates a randomness quality value or entropy value. The randomness quality value indicates the strength of a given generated random number. For example, a low randomness quality value indicates a weak or more predictable series of bits in the random number. Conversely, a high randomness quality value indicates a strong or less predictable series of bits in the random number. In one embodiment, hard disk drive 108 automatically generates a randomness quality value with each random number that the hard disk drive 108 generates. In another embodiment, hard disk drive 108 generates a randomness quality value with each random number that hard disk drive 108 generates on demand based on a command received from host system 102. Hard disk drive 108 can transmit the randomness quality values to host system 102. Host system 102 can display the randomness quality values to a user through a user interface. The randomness quality value is useful to a user in various applications such as when using random numbers to generate high-security encryption keys.

Pseudorandom Number Generator

In one embodiment, hard disk drive 108 processes the generated random number in a pseudorandom number generator. Controller 112 can function as the pseudorandom number generator. For example, controller 112 can feed a random number (e.g., random number seed) into a mathematical algorithm, which performs a function such as a hash function in order to extend one truly random number (i.e., the seed) into a larger amount of pseudo-random numbers.

User Interface for Requesting and Accessing Random Numbers

In one embodiment, hard disk drive 108 provides the generated random number, randomness quality value, or a random number processed by the pseudorandom number generator, or combination thereof to a user (e.g., operating system administrator, end user, etc.) via host system 102. In one embodiment, the controller 112, host operating system 114, or one of the applications 106 in host system 102 provides a user interface for requesting a random number and for accessing the random number. According to a particular embodiment, the interface enables the user to select the method for generating the random number (e.g., generating a random number based on servo information, channel noise, etc.) or any other parameters (e.g., size of the resulting random number). In another embodiment, the interface enables the user to select what information the user wants to receive. For example, the user can select options to receive a random number, a randomness quality value, a random number processed by the pseudorandom number generator, or any combination thereof. After the random number has been generated, the random number can be displayed on a display screen to the user through the user interface.

As indicated above, hard disk drive 108 can generate a random number in response to receiving a request from host system 102. The request can be a command exclusively requesting a random number or a part of an existing command requesting other information. In one embodiment, if the request is a command exclusively requesting a random number, hard disk drive 108 generates the random number and then returns the random number to the user via the user interface. In one embodiment, if the request is an augmented portion of an existing Operating System command for generating a random number, hard disk drive 108 generates the random number using a physical random number generation process such as one described above (as opposed to a mere pseudorandom number generation process). Hard disk drive 108 then returns the random number to the user via the user interface or via another suitable interface such as an Operating System interface. In one embodiment, if the request is an augmented portion of an existing command such as a hard disk drive command (e.g., ATA or SCSI command), hard disk drive 108 generates the random number and then returns to the user the random number along with any other requested information via the user interface.

The foregoing description of the exemplary embodiments of the present invention has been presented for the purpose of illustration and description and is not intended to be exhaustive or to limit the scope of the present invention to the precise form disclosed. For example, embodiments of the present invention can be implemented using one or a combination of hardware, software, and a computer-readable medium containing program instructions. Software implemented by embodiments of the present invention and results of the present invention can be stored on a computer-readable medium such as memory, hard disk drive, compact disc (CD), digital video disc (DVD), or other media. Results of the present invention can be used for various purposes such as being executed or processed by a processor, being displayed to a user, transmitted in a signal over a network, etc. A latitude of modification, various changes, and substitutions are intended in the present invention. In some instances, features of the present invention can be employed without a corresponding use of other features as set forth. Many modifications and variations are possible in light of the above teachings, without departing from the scope of the present invention.

What is claimed is:

1. A hard disk drive for enhancing random number generation, the hard disk drive comprising:
a storage subsystem; and
a controller, wherein the controller generates a random number based on errors in data read from a hard disk in the hard disk drive that are detected using an error correction algorithm, and wherein the controller transmits the random number to a host system.

2. The hard disk drive defined in claim 1 wherein the controller generates the random number in response to receiving a request to generate the random number, and wherein the request is a part of code that augments an existing hard disk drive command.

3. The hard disk drive defined in claim 1 wherein the controller generates the random number in response to receiving a request to generate the random number, and wherein the request is a part of code that augments a pseudorandom number generator command.

4. The hard disk drive defined in claim 1 wherein the controller exports the random number to a user.

5. The hard disk drive defined in claim 1 wherein the controller further generates a randomness quality value that indicates the strength of the random number.

6. The hard disk drive defined in claim 1 wherein the controller further processes the random number in a pseudorandom number generator, wherein the controller functions as the pseudorandom number generator.

7. A computer system for enhancing random number generation, the computer system comprising:

a computer readable storage medium having code thereon, the code comprising:
- code for generating a random number using a hard disk drive, wherein the random number is generated based on errors in data read from a hard disk in the hard disk drive that are detected by an error correction algorithm; and
- code for transmitting the random number to a host system.

8. The computer system defined in claim 7 wherein the code for generating the random number further comprises code for generating the random number in response to receiving a request to generate the random number, and wherein the request is a part of code that augments an existing hard disk drive command.

9. The computer system defined in claim 7 wherein the code for generating the random number further comprises code for generating the random number in response to receiving a request to generate the random number, and wherein the request is a part of code that augments a pseudorandom number generator command.

10. The computer system defined in claim 7 wherein the code for transmitting the random number to the host system further comprises code for transmitting the random number to a host operating system in the host system, and the computer system further comprises code for enabling user access to the random number through a user interface.

11. The computer system defined in claim 7 further comprising code for exporting the random number to a user.

12. The computer system defined in claim 7 further comprising code for generating a randomness quality value that indicates the strength of the random number.

13. The computer system defined in claim 7 further comprising code for processing the random number in a pseudo-random number generator.

14. A method for enhancing random number generation, the method comprising:
- generating a random number using errors in data read from a hard disk in a hard disk drive that are detected by an error correction algorithm; and
- transmitting the random number to a host system.

15. The method defined in claim 14 wherein generating the random number further comprises generating the random number in response to receiving a request to generate the random number, wherein the request is a part of code that augments an existing hard disk drive command.

16. The method defined in claim 14 wherein generating the random number further comprises generating the random number in response to receiving a request to generate the random number, wherein the request is a part of code that augments a pseudorandom number generator command.

17. The method defined in claim 14 wherein transmitting the random number to the host system further comprises transmitting the random number to an application in the host system, and the method further comprises enabling user access to the random number through a user interface in the application.

18. The method defined in claim 14 further comprising exporting the random number to a user.

19. The method defined in claim 14 further comprising generating a randomness quality value that indicates the strength of the random number and providing the randomness quality value to a user through a user interface.

* * * * *